United States Patent [19]

Fantone

[11] Patent Number: 5,280,336
[45] Date of Patent: Jan. 18, 1994

[54] AUTOMATED RADIUS MEASUREMENT APPARATUS

[75] Inventor: Stephen D. Fantone, Lynnfield, Mass.

[73] Assignee: Optikos Corporation, Cambridge, Mass.

[21] Appl. No.: 677,260

[22] Filed: Mar. 29, 1991

[51] Int. Cl.$^5$ .............................................. G01B 9/00
[52] U.S. Cl. .................................................. 356/124
[58] Field of Search ................... 356/124–127, 123; 351/212, 247; 250/201.1, 201.2, 201.3, 201.7

[56] References Cited

U.S. PATENT DOCUMENTS

| | | | |
|---|---|---|---|
| 2,466,015 | 4/1949 | Ewing | 356/124 |
| 3,447,874 | 6/1969 | Back | 356/124.5 |
| 3,740,150 | 6/1973 | Munnerlyn | 356/124 |
| 3,856,407 | 12/1974 | Takeda et al. | 356/123 |
| 3,904,294 | 9/1975 | Gold et al. | 356/124 |
| 4,149,801 | 4/1979 | Volk | 356/124 |
| 4,588,270 | 5/1986 | Tamaki | 351/212 |
| 4,653,923 | 3/1987 | Kitabayashi | 356/124 |
| 4,818,108 | 4/1989 | Eppinger | 356/124 |
| 4,920,273 | 4/1990 | Sacks et al. | 250/560 |
| 4,963,724 | 10/1990 | Neumann | 250/201.3 |

FOREIGN PATENT DOCUMENTS

| | | | |
|---|---|---|---|
| 0118639 | 6/1986 | Japan | 356/124 |
| 0205704 | 8/1990 | Japan | 356/124 |
| 719700 | 12/1954 | United Kingdom | 356/124 |

Primary Examiner—Richard A. Rosenberger
Assistant Examiner—Hoa Q. Pham

[57] ABSTRACT

A system for the automatic measurement of radius of curvature of convex or concave optical surfaces such as those of lenses, molds, inserts, ball bearings or micro-optics. The system includes an 80286 based AT computer for control, operator interface and analysis along with an optical head for providing a signal from which radii can be calculated.

21 Claims, 14 Drawing Sheets

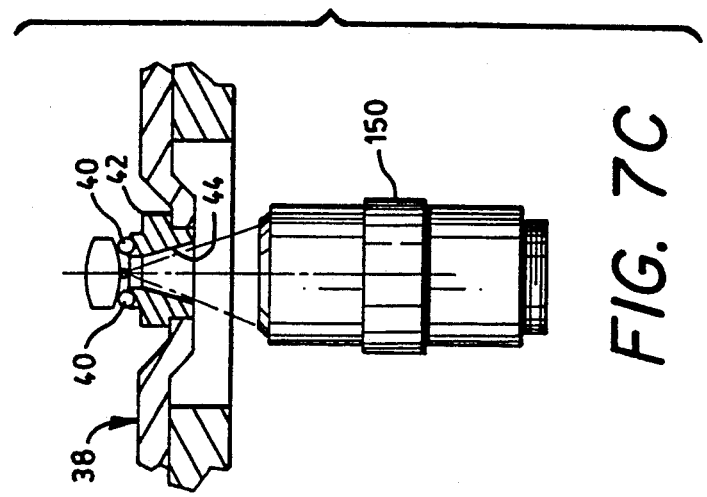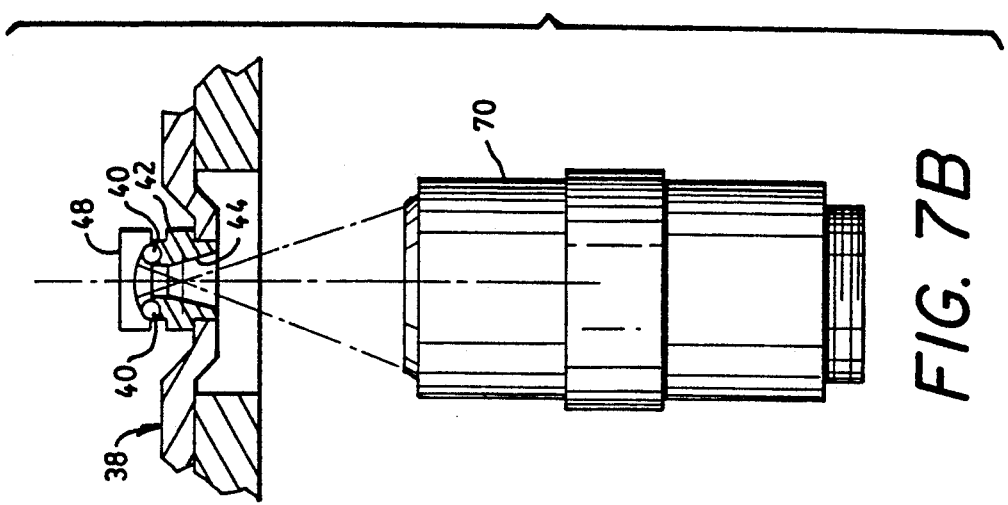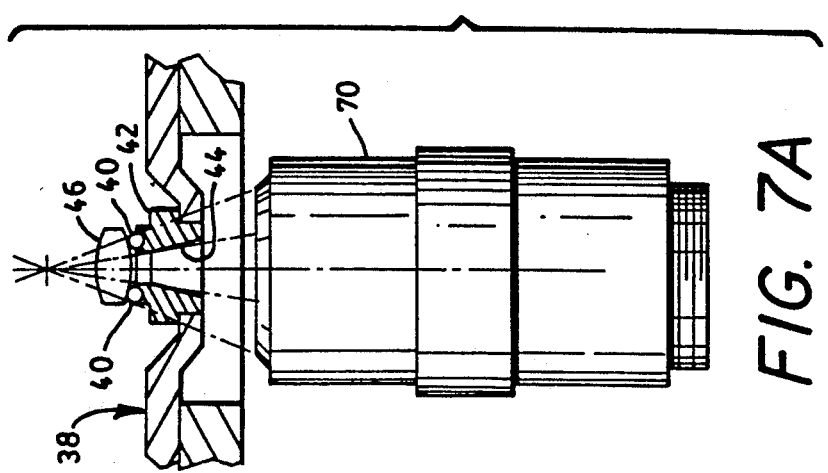
FIG. 7C
FIG. 7B
FIG. 7A

AUTOMATED RADIUS MEASUREMENT APPARATUS

BACKGROUND OF THE INVENTION

1. Field of the Invention

This invention generally relates to methods and apparatus for testing optical systems and particularly to devices and techniques for the automated measurement of radii of curvature of a variety of optical surfaces including those of optical elements themselves as well as those used to form them.

2. Background of the Prior Art

Throughout the process for fabricating optical systems from simple to more complex, it is frequently necessary to determine if, and how well, a variety of optical surfaces conform to their designers stated expectations. Not only does the performance of optical systems in final form need to be verified but various parameters of their components need to undergo intermediate testing for conformance prior to their final assembly in the system. Indeed, even the tools of fabrication, especially molds for the formation of plastic or glass lens elements, need to be tested for compliance with design specifications.

One of the most frequently encountered measurements that needs to be made is that of the radius of curvature of a spherical surface in either convex or concave form. Classically, this measurement is made through the use of a hand-held instrument called a spherometer which measures the sagittal height (sag) of the surface over a known diameter and then displays the radius of curvature on a dial or other visual display after an internal calculation which relates radius to sag height and the known diameter. However, the accuracy of such devices are prone to relatively large errors because sag heights are usually small dimensions that are difficult to accurately measure mechanically.

A more accurate technique for radii measurement involves the use of an auto-collimating microscope in an arrangement referred to as a radiusscope. Here, one first focuses on the surface to be measured and then on the center of curvature of the surface where a reticle image has been formed back on itself by reflection from the test surface. The positions of the microscope are recorded, and the difference between them represents the radius of curvature to limits of accuracy which depend on the preciseness of the length measurements and the ability of the operator to accurately focus on the reference points.

Where the spherometer suffers from problems of precision, the use of the radiusscope, which can be accurate to microns if care is taken, is time consuming and dependent on operator skill and experience.

Consequently, there is a need for an instrument for the rapid and accurate measurement of radii of curvature, and it is a primary object of the present invention to provide such a device.

Another object of the present invention is to provide methods and associated devices for automatically measuring radii of curvature and other parameters of optical surfaces with minimal dependence on operator skill.

Yet another object of the present invention is to provide an automated instrument for providing statistical analysis of quality in high volume production settings.

Still another object of the present invention is to satisfy all of the foregoing objects with a user friendly device that is simple in its implementation and low in cost.

Other objects of the invention will in part be obvious and will in part appear hereinafter. A full understanding of the invention will best be had from reading the detailed description to follow in connection with the detailed drawings.

SUMMARY OF THE INVENTION

An automated radius measurement system instrument is provided as a non-contacting spherometer to measure spherical optical surface radii in an expedient and accurate manner. The system is comprised of an 80286 based AT computer, a special interface board, an optical head, and a light source usually present as a component of the optical head. It's most common use is for the measurement of plastic molds and inserts for the optical industry. In its customary mode of operation, the surface to be measured is placed upon a special, self-centering 3-point assembly and a start button depressed by an operator. The radius of the mold is then presented on an attached computer monitor. The entire process requires less than three seconds, and radii are measured to accuracies of one part in 2000 or better.

Along with this basic capability, a number of additional features are provided. After undergoing a self-check using a mold or other optical surface (presenting the mold as a standard), the instrument can, in less than three seconds, measure the radii of subsequent parts with the option of writing data to a file for later review. System software can accumulate lot data and provide go/no-go sorting of parts in a production environment for quality control purposes.

The part to be measured must be near spherical with a radius within the envelope of the preset internal limits, and must provide a specular reflection, although the reflection can be quite low. With the part placed horizontally on the 3-point mount, system uses an optical imaging analysis technique implemented via an internal analyzer and associated software to first find the vertex of the surface-under-test and then its center of curvature. By definition, the longitudinal difference between these two locations is the radius of curvature. As the analyzer scans through each of these locations, the signal at a detector is momentarily peaked and the location of this peak is recorded and processed. Therefore, the desired qualities in such an instrument involve the range of travel of the analyer and the ability to record the signal peaks. The benefit of the system is that expedient determination of radius is achievable. It is easily seen that the process of fabricating contact lens molds, inserts, and the lenses themselves are candidates for instrument usage. For example, machinists can measure their insert generation or polishing work throughout the fabrication process. Quality control is another primary usage for such an instrument. Back vertex powder, for instance, can be easily calculated from knowledge of the radii of curvature of a lens and its thickness and the optical properties of the material from which it is made. In this way, the performance of contact lenses can quickly be measured.

One embodiment provides for the measurement of back focal length of refractive elements. Here, the system is adapted to include a retroreflecting addition above the lens under test. In this case, light is passed through the lens, reflected, and then passed back through the lens. The analyzer here operates to locate the focus of the lens and vertex of a reference surface;

the difference of these two locations is the back focal length.

In a yet another preferred embodiment, a kinematic rotary stage provides the capability for radius measurements at multiple azimuths across a part thus permitting torics to be studied.

Finally, it is possible to have more or less simple versions of the system with different measurement capabilities, costs, and ranges of ability through the simple expediency of using microscope objectives with different working distances and associated software.

DESCRIPTION OF THE DRAWINGS

The structure and operation of the invention together with other objects and advantages thereof may best be understood by reading the detailed description in connection with the drawings wherein parts appearing in different drawings have the same reference numeral throughout and wherein:

FIG. 7a is a partial vertical section of part of the optical head of the system of FIG. 5 taken along line 7a—7a thereof illustrating the use of the inventive system in the measurement of a convex surface;

FIG. 7b is similar to FIG. 7a except that it illustrates the use of the inventive system in the measurement of a concave surface;

FIG. 7c is similar to FIGS. 7a and 7b except showing the use of a microscope objective having a smaller working distance and thus more limited range of measurement;

DETAILED DESCRIPTION

The present invention is a system for rapidly and accurately measuring radii of curvature of a variety of optical surfaces including those of lenses and mold surfaces for forming them. It can exist in more or less complex forms depending on a selection of available features and desired range of operation, but in all of its forms, its principle of operation is the same.

Figure 1:
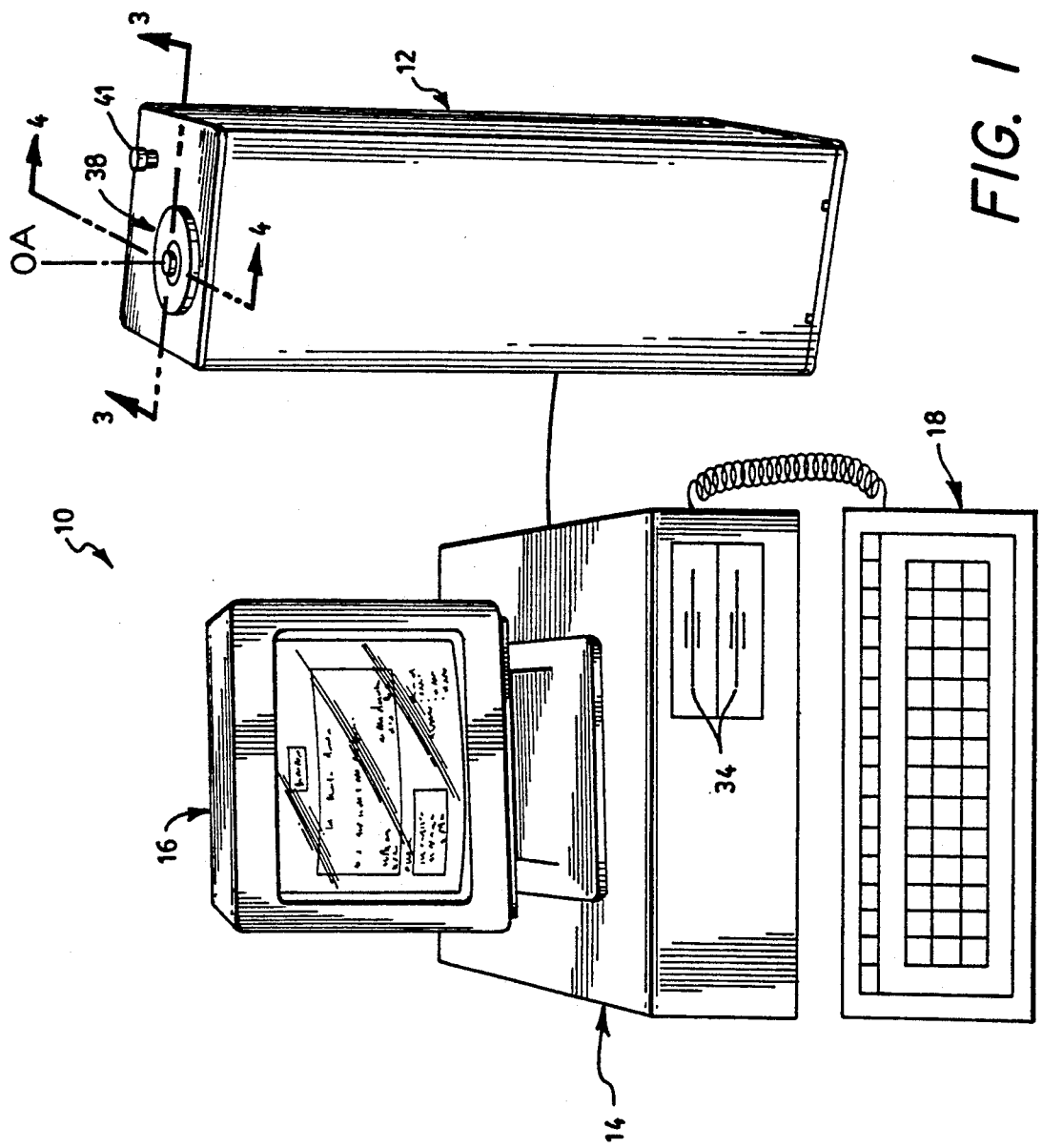
FIG. 1 is a diagrammatic perspective of a preferred embodiment of the inventive radius measuring system having the capability of measuring the convex, concave, and toric surfaces.
Figure 2:
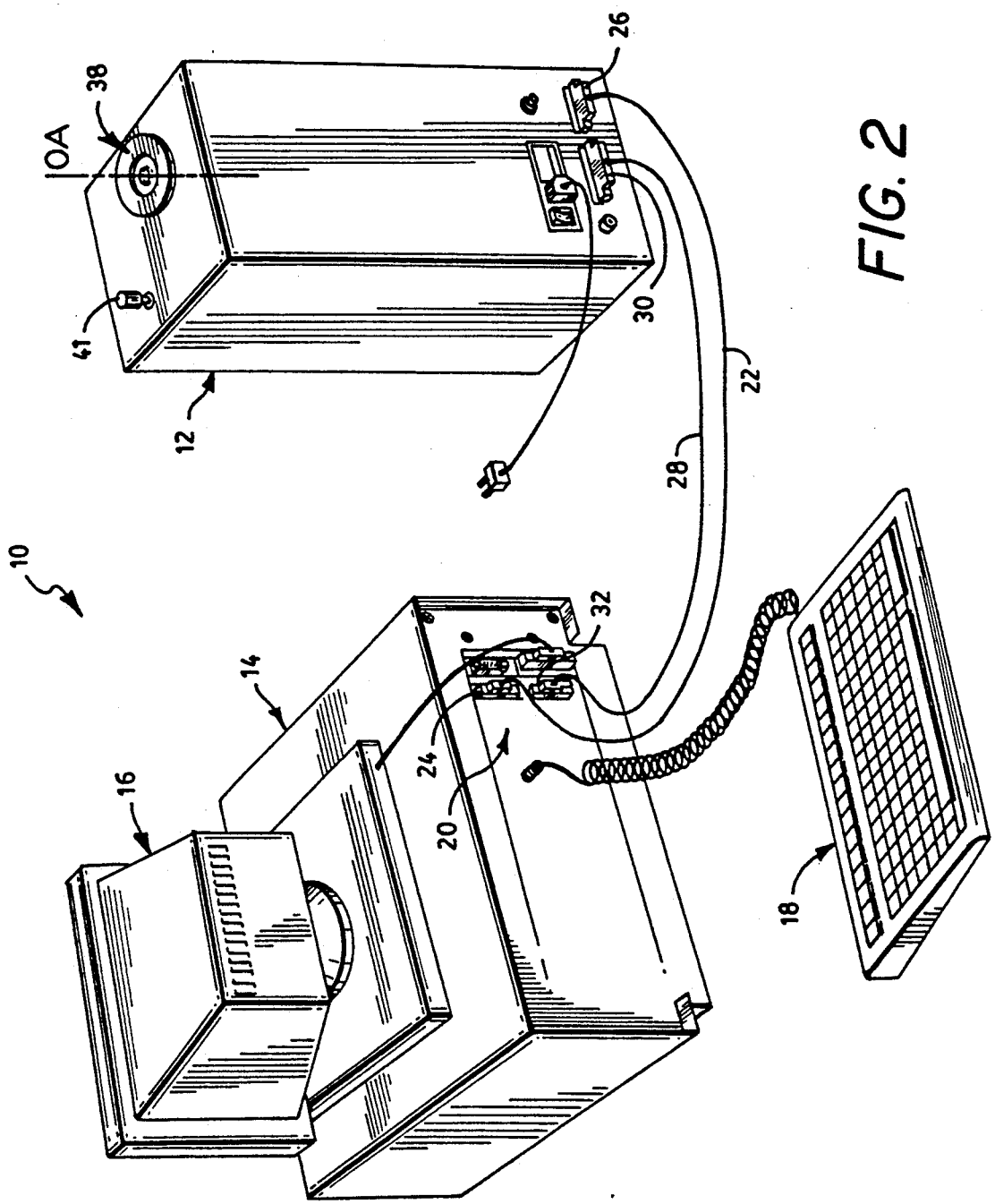
FIG. 2 is a diagrammatic perspective of the rear of the system of FIG. 1.

Within less than three seconds, for example, a measurement of radius of curvature can be made to an accuracy of less than 2.5 $\mu$m error. A preferred form of the inventive system with the versatility of automatically measuring concave and convex curvatures over a wide range of curvatures and along different azimuths of rotation is shown in FIGS. 1 and 2 where it is designated at 10. As can be seen in those Figures, automatic radius measuring system 10 comprises a vertically oriented optical head 12, an AT, 80286 based computer 14, a monitor 16, preferably color, and a keyboard that is preferably an enhanced type with 101 keys with twelve function keys (F1-F12) arranged above its alphanumeric keys. Optical head 12 is electrically connected to computer 14 via an interface board 20 (FIG. 2) located in one of computer 14's expansion slots. Board 20 is configured in a well-known manner as an I/O board to: provide an electronic link between computer 14 and optical head 12 for the transmission of electrical and logic signals between them; provide drive signals to stepper motors located in optical head 12; and perform certain signal processing operations on raw signals generated by a photodetector in optical head 12. The electrical link is provided by a pair of cables, 22 and 28, whose ends are each provided with RS 232 connectors designated as 24 and 26 for cable 22 and 30 and 32 for cable 28. Keyboard 18 operates in the usual way in providing the operator with a means for communicating commands to computer 14, and monitor 16 displays a variety of responses to the operator including measurement data, system status, and menu options to be selected for system control and direction. In addition, data and computer instructions in the form of programs may be transferred between operator and computer via one or more disk drives such as those shown typically at 34 in FIG. 1.

Figure 3:
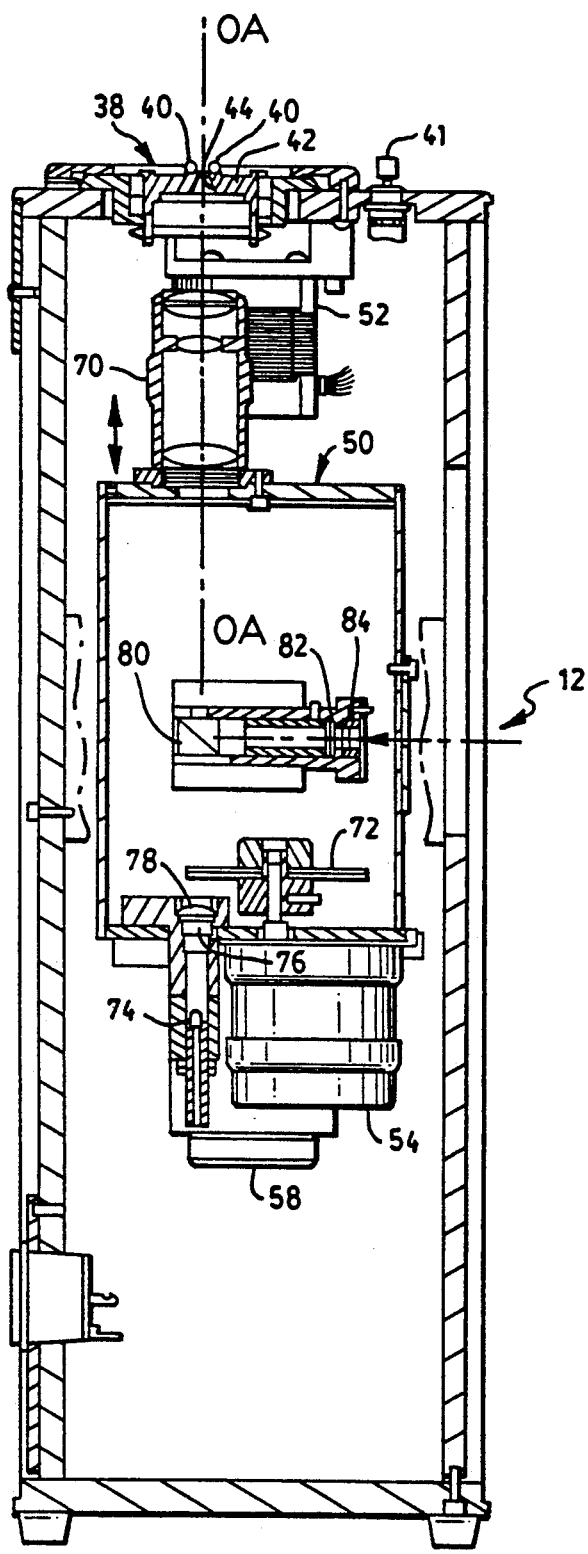
FIG. 3 is a vertical section, with parts broken away, of the optical head section of the system of FIG. 1 taken along line 3—3 therein.
Figure 4:
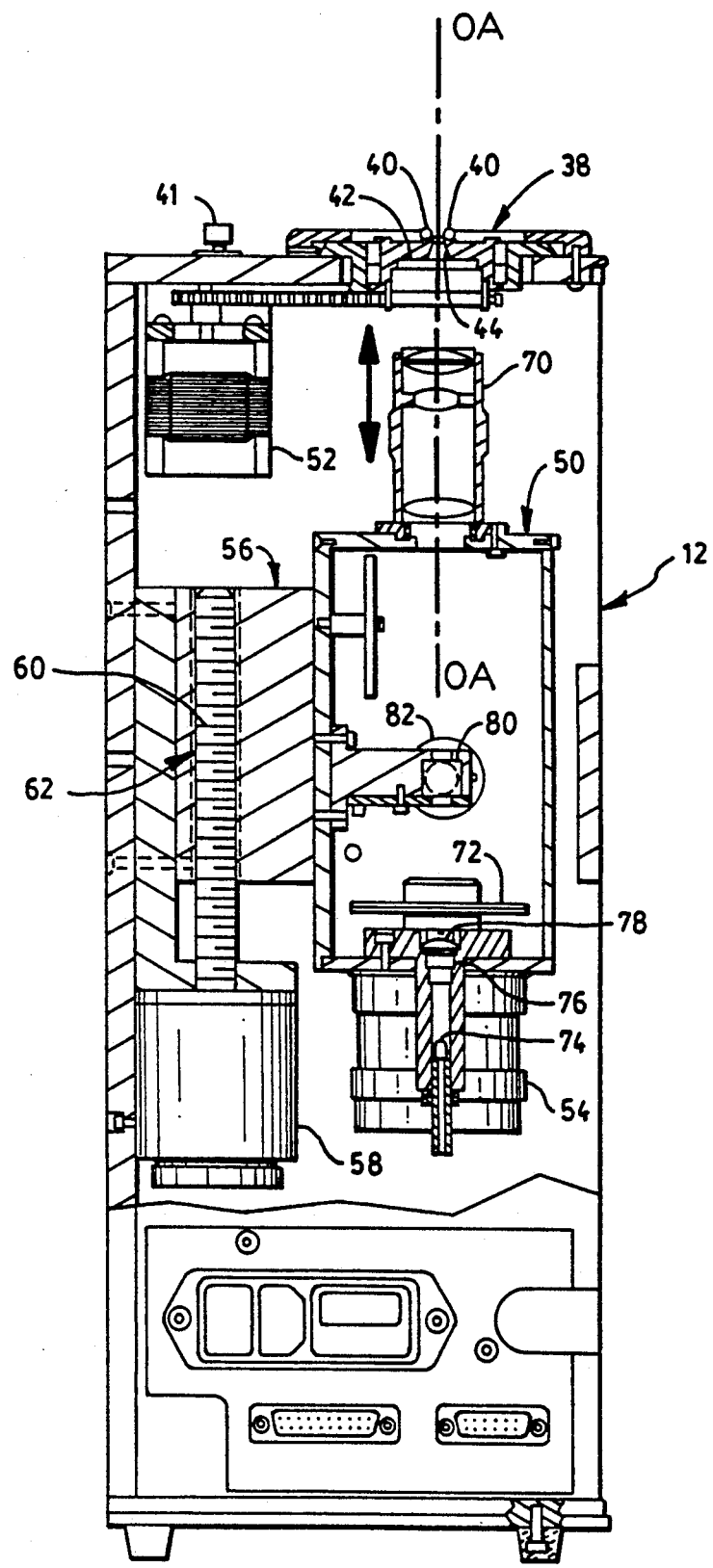
FIG. 4 is a vertical section, with parts broken away, of the optical head section of the system of FIG. 1 taken along line 4—4 therein.
Figure 17:
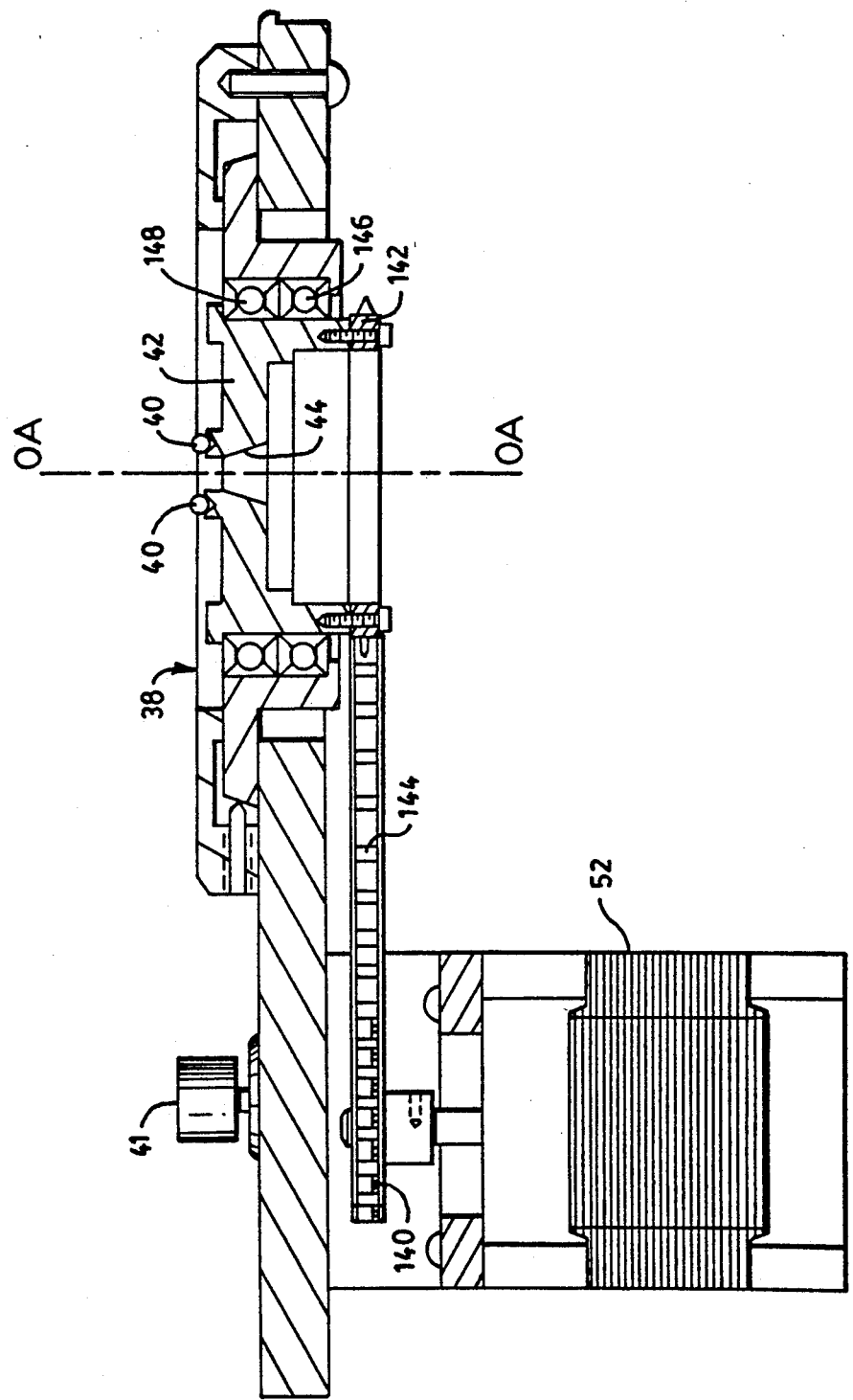
FIG. 17 is an enlarged view of part of the vertical section of FIG. 4 showing in more detail the various parts of the rotary stage of the inventive system.

On top of optical head 12 is a rotary stage 38 for receiving and supporting test optical elements in a reference plane which can be precisely rotated to measure radius of curvature along different azimuths of the element under test. The fixed reference plane, as best seen in FIG. 17, is defined by three nylon balls 40 (only two of which are shown) that are precisely located in a nest ring 42 with a tapered conical tunnel that extends through to the interior of optical head 12 and is centered about its optical axis, OA, as seen in FIGS. 3 and 4. As can be seen in FIGS. 7a and b, test elements, such as those shown as 46 and 48, are automatically located by this three-ball location arrangement in the reference plane even if they are slightly tilted about their own axis. When viewed from above, a circle centered on optical axis, OA, and drawn through the centers of each of them defines the semidiameter of the reference plane from which surface sag height can be reckoned.

Referring now to FIGS. 3 and 4, which show the interior of optical head 12, it can be seen to further comprise a scanning head 50, which can be vertically moved along optical axis, OA, via a translation stage 56 that, in turn, is driven via a precision lead screw 60 driven by a precision stepper motor 58 fixed to the rear wall of optical head 12 and under command of computer 14. Translation stage 56 moves parallel to optical axis, OA, on a complementary configured precision slide arrangement not shown in detail, but generally designated at 62 in FIG. 4. The pitch of lead screw 60 and the rotational steps of motor 58 are preferably selected in a well-known manner so that each pulse delivered to stepper motor 58 moves scanning head 50 up or down by a small fraction of a millimeter. Computer 14 is programmed in a well-known manner to keep track of the position of scanning head 50. In addition, a limit switches may be provided to prevent scanning head 50 from mechanically interfering with any structure beneath rotary table 38 and also when closed to provide a locating signal indicating that scanning head 50 has reached its uppermost position. In this manner, means are provided for precisely moving scanning head 50 along optical axis, OA, while at the same time providing a signal by which its vertical position can be monitored and controlled via computer 14.

Figure 5:
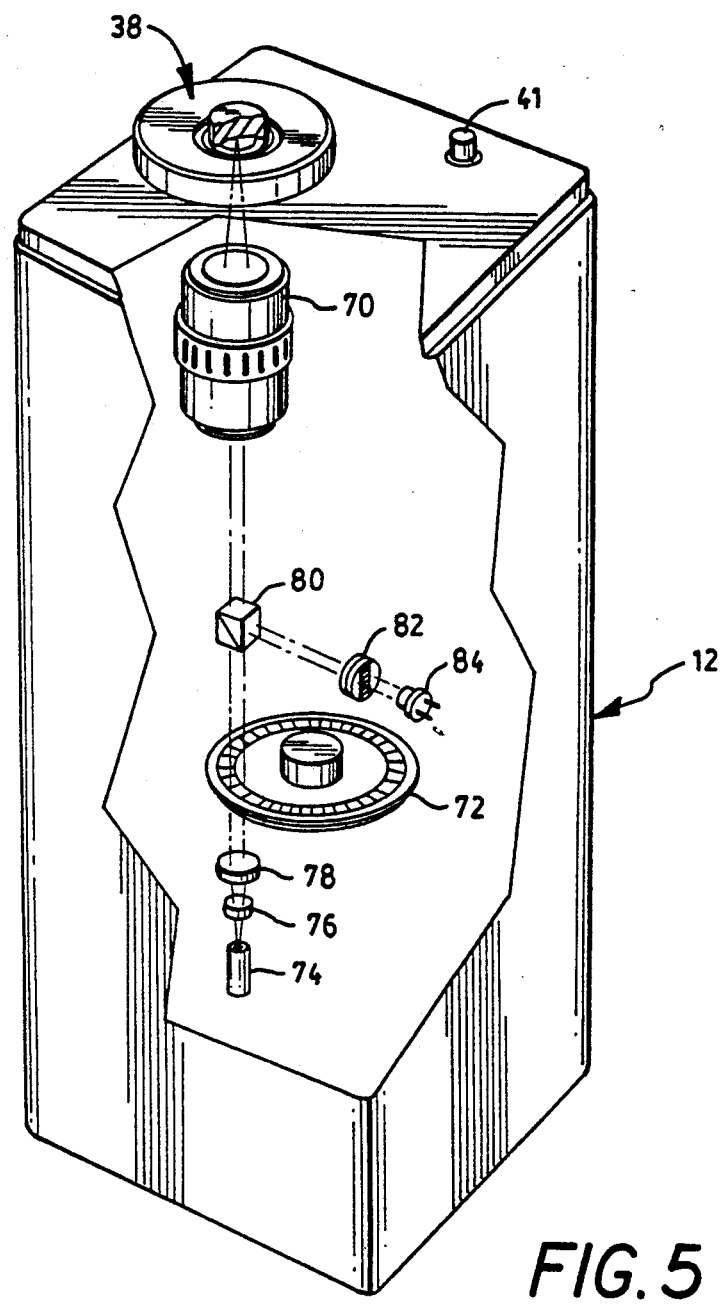
FIG. 5 is a diagrammatic perspective of the optical head of the system of FIG. 1 showing in phantom various optical components, the rotary nest for a test part, and a detector.

Scanning head 50 comprises a number of components all of which travel together along optical axis, OA. As best seen in FIG. 5, with occasional reference back to FIGS. 3 and 4, these are seen to comprise a microscope objective 70, a circular grating 72 mounted for rotation about its axis and driven by a clock motor 54, a source of illumination 74 preferably in the form of an LED, a pair of lenses 76 and 78, a beamsplitter 80 located between objective 70 and grating 72 for purposes of providing a signal branch at right angles to optical axis, OA. Filters may also be used as needed to control the spectral output of the LED. Along the signal branch is a fixed grating 82 that is preferably a segment of a grating like rotating grating 72. Following fixed grating 82 is a silicon photodetector 84 for providing output signals which are transmitted to computer 14 via I/O board 20 where they undergo additional conditioning prior to their passage to computer 14.

Light source 74 is preferably an LED although a fiber optic source may be used. Considerations in the choice of the type of source to use include efficiency, cost, ease of adjustment of light levels, and compactness. The spectral output of the source 74 is important because objective lens 70, being a microscope objective, is in the best case corrected for the visible. So, the spectral content of source needs to be considered in terms of its impact on signal level because of any longitudinal aberration introduced at wavelengths outside the visible region. Consequently, an LED is quite acceptable because it is a narrow source with no speckle or laser coherence problems. In addition it is fairly monochromatic and easy to modulate. The bandwidth of a narrow LED source for this purpose is typically tens of nanometers wide, not hundreds, and are easily commercially available at low cost. In addition, they require low power to operate and have low heat dissipation.

Following source 74 is a lens system that is optional but when present comprises elements 76 and 78 which are configured to image LED source 74 in the aperture of the objective 70 for reasons of efficiency. The beam impinging on rotary grating 72 does not need to be collimated, and it illuminates several periods of rotary grating 72 simultaneously. What is required though is to illuminate grating 72 so that the amount of light passing through the aperture of objective 70 is optimized.

Figure 6A:
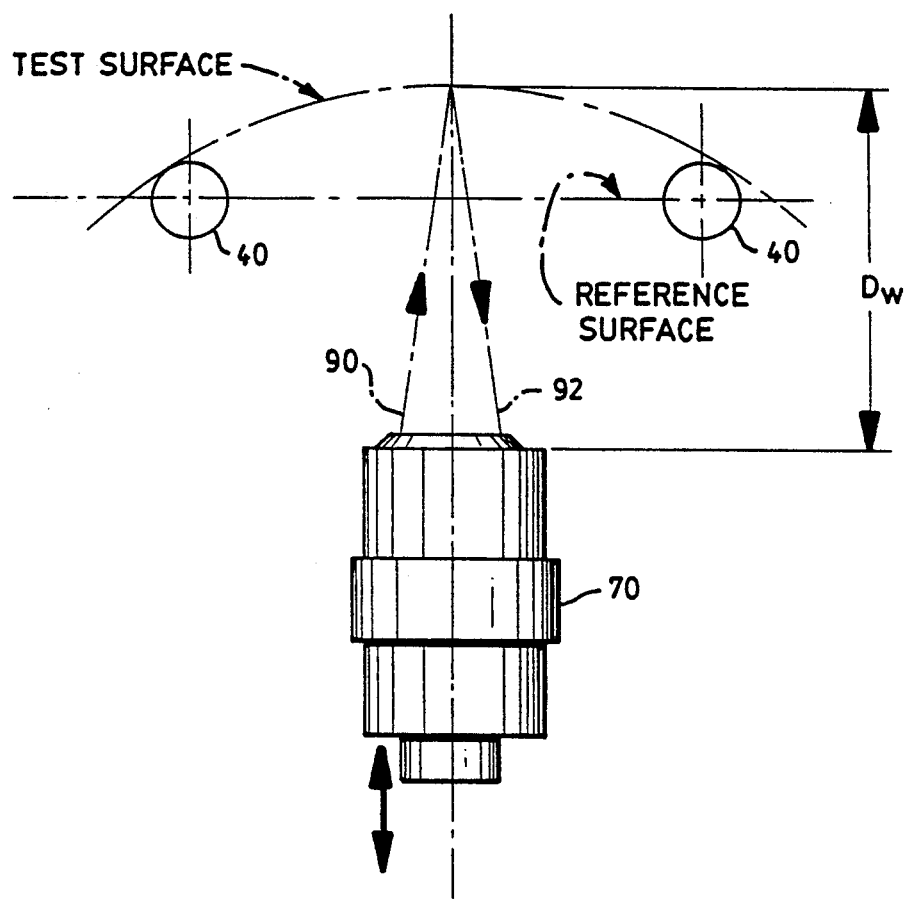
FIGS. 6a and 6b diagrammatically illustrate how a test target is reflected back on itself from a surface to be measured when, respectively, is imaged from the surface vertex and its center of curvature.
Figure 6B:
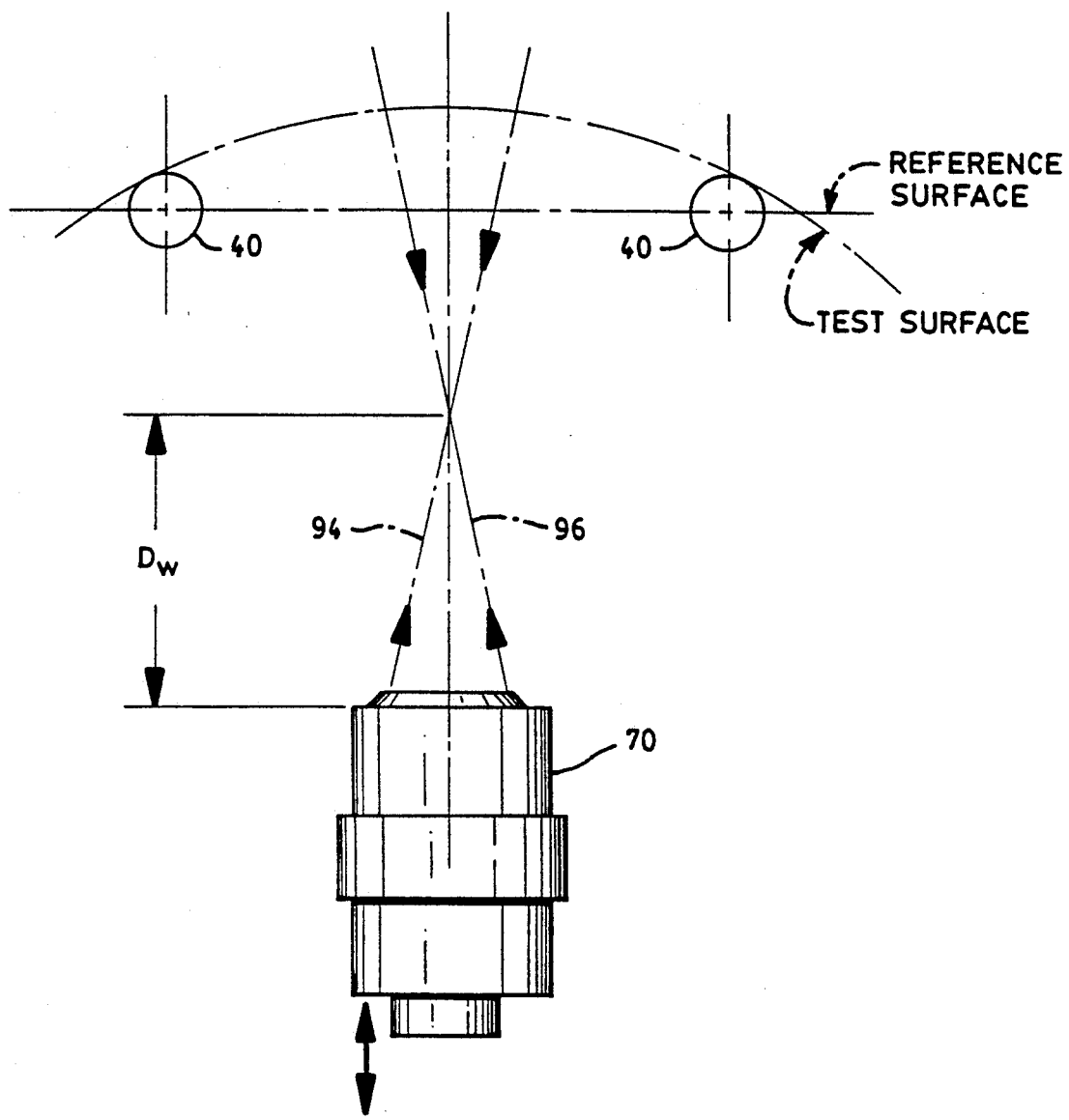

Rotating grating 72 with a spatial frequency fixed at about 6 line pairs/mm thus interrupts the output beam of LED source 74 to provide a changing illumination pattern while grating 72 is imaged into space behind following microscope objective 70 at its working distance, $D_w$, as shown in FIG. 6a and 6b. As can be appreciated, working distance and the mechanics of the system geometry provide limitations on the range of radii which can be measured which, for a particular 10× objective with a long working distance of 24 mm is between 3 and 13 mm.

When a surface to be measured is placed so that it rests on the reference plane defined by balls 40, the image of grating 72 is reflected from it and directed back on itself, more or less perfectly depending on the location of scanning head 50 with respect to the test surface vertex or center of curvature as will subsequently be explained. A portion of the reflected image is directed onto fixed grating 82 via beamsplitter 80. When the image on the fixed grating 82 corresponds to its spatial frequency, photodetector output 84 has its highest signal modulation. This is so because of the proximity of fixed grating 82 to the surface of photodetector 84 and the close overlap of the image of rotating grating 72 on a segment of itself, fixed grating 82. At other times, due to defocus, there will be a beat frequency generated that causes a mismatch between the frequency of the superimposed image and fixed grating 84 thereby degrading the throughput of light to photodetector 84 with the resultant output signal level lowered as a consequence.

As scanning optical head 50 translates up and down, toward and away from a test surface, two points are passed through where the signal from photodetector 84 peaks. It is the distance between these peaks that is the radius of curvature of the test surface.

One of the points where this occurs is where grating 72 and its image are superimposed when the image of it formed at the working distance of microscope objective 70 is at the apex of the test surface as illustrated in FIG. 6a. Here, the incoming rays, 90 for example, reflect in accordance with the laws of reflection to follow exactly along a reversed path back into microscope objective 70. Ray 92, for example, is the return path for ray 90. This is like a catseye situation with a mirror in the focal plane behind a lens. What is happening is that the ray that goes in the top, gets reflected at the focal point and then goes out the bottom. It is not a retro in the true sense, but a ray that goes in the top comes out the bottom and back. A ray that enter from the bottom hits a mirror in focus and goes out the top. Consequently, the image is inverted since the rays are interchanged. And, this works for both convex and concave surfaces because rays that enter from the top in each case hit a surface as a ray normal to that surface so that it just retraces its path. To appreciate that this is true, imagine a circle centered on the focal point and trace a ray from a convex surface through the center of the focus and to the opposite side of the circle. This is a concave side with the ray intercepting it also as a normal. So, in both cases, the rays behave the same regardless of the sense of curvature. What works for one, works for the other.

The other point at which a peak signal occurs is when the image at the working distance of microscope objective 70 is at the center of curvature of the test surface, again either concave or convex. This is illustrated with a concave surface as shown in FIG. 6b. Here incoming rays, 94 and 96, in this case are retroreflected back on themselves since they are incident to the test surface at right angles.

The distance between the locations where the peak signals occurs is the radius of curvature of the test surface which is detected and quantified in a manner to be described.

Thus, this technique of having a fixed grating and a rotating grating used in conjunction with a detector is really means for detecting focus. It involves taking the image of rotating grating 72 reflected from the test surface and superimposing that on a reference grating of like spatial frequency, but inverted in image sense, so that when the superimposed images are slightly out of focus, the image made of that grating being defocused is slightly softer. However, as the image of the rotating grating 72 is moved, the signal modulation that occurs is not as great as it would be when focus is perfect. The basic scheme then is one for reliably detecting focus and providing a readout on its quality in a relatively short period of time. In this case, because rotating grating 72 modulates the Moire pattern at roughly three and one-half kilohertz, it means that in a thousandth of a second or faster, the quality of focus can be known. As the whole scanning head 50, the grating, fixed detector, and the lens move from one position to the other, it only takes a thousandth or so to establish whether or not focus is sharp. In this way, a signal is provided that changes in a rapid way and to allow for rapidly discriminating changes in the quality of the focus.

Figure 8:
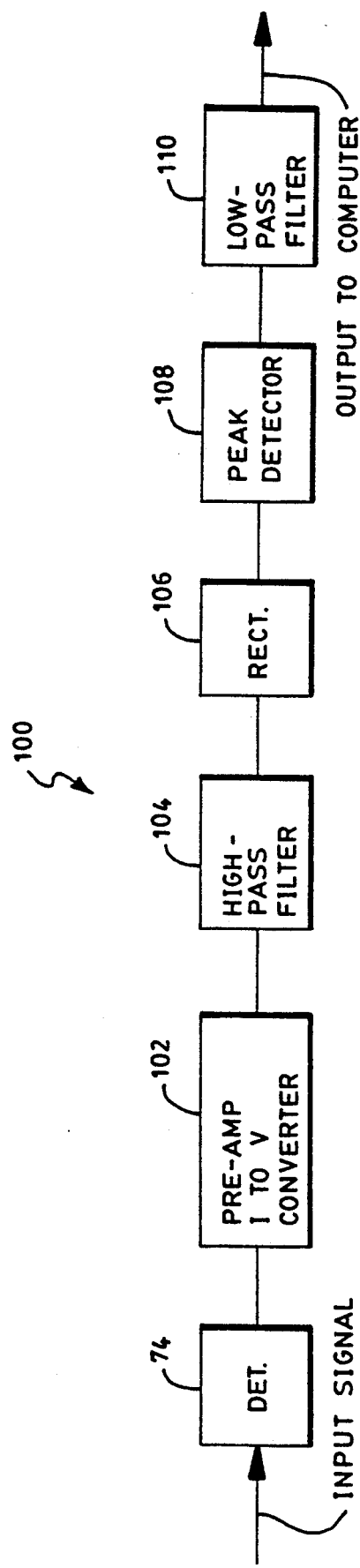
FIG. 8 is a block diagram of the detector and signal processing components of the inventive system.

Prior to any algorithmic operations, the basic signal from photodetector 84 is first conditioned by a signal processor generally designated at 100 in FIG. 8. Processor 100 comprises a preamplifier 102, a high-pass filter 104, a peak detector 108, and a low-pass filter 110. All of these components are well-known and of conventional design.

Figure 9:
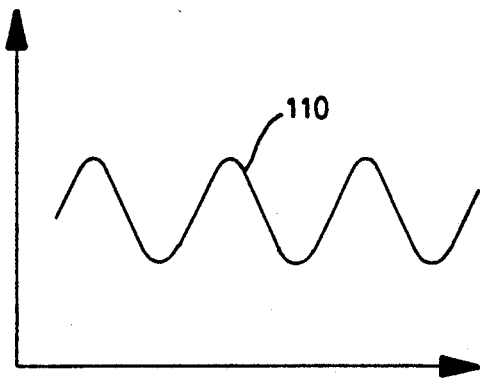
FIG. 9 is a graph of current output with time for a fixed position of the scan head of the inventive system.
Figure 11:
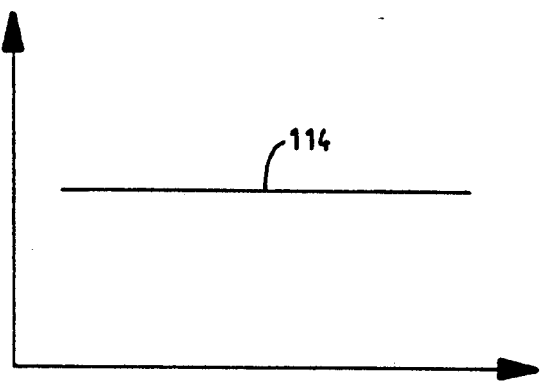
FIG. 11 is graph of the signal from the peak detector of FIG. 8 for a fixed position of the scan head of the inventive system.
Figure 10:
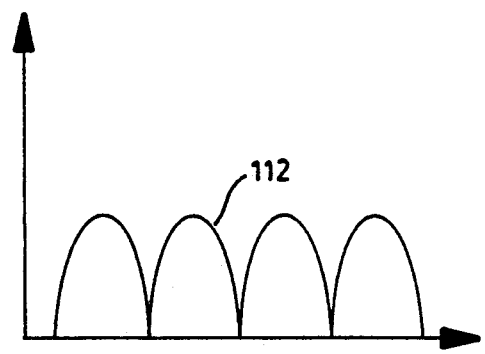
FIG. 10 is a graph of the signal output from the preamp stage of FIG. 8 for a fixed position of the scan head of the inventive system.
Figure 12:
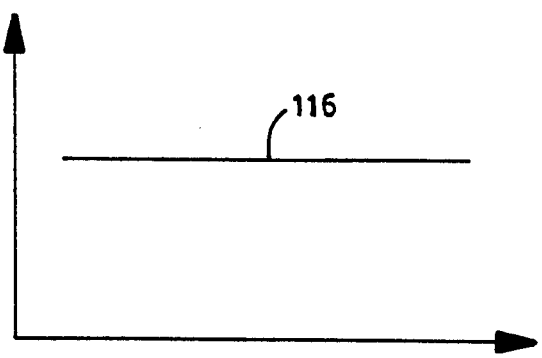
FIG. 12 is a graph of the signal output from the low pass filter of FIG. 8 for a fixed position of the scan head of the inventive system.

The form of the basic signal coming out of photodetector 84 when at one of the two peak signal points is shown diagrammatically as the curve labeled 110 in FIG. 9. It may be single polar or bipolar, but basically there is some offset level, a lot of noise on it, and a variety of 60 cycle effects. This signal is run through a current to voltage converter, preamplifier 102, where it is AC coupled. Afterwards, it passes through a high-pass filter 104 which takes out any lower frequency fluctuations and then a rectifier 106 from which it emerges with the approximate appearance of curve 112 in FIG. 10. Afterwards, a peak detector 108 operates to generate a signal, labeled as 114 in FIG. 11, which follows the peaks of the rectified sine wave 112 of FIG. 10. This signal is then sent through low-pass filter 110 to provide a signal that is made to vary at a rate that is compatible with the sampling rate of a following A/D sampler of conventional design located on I/O board 20 in computer 14. Typically, the sampling rate of the A/D converter is a thousand times a second so fluctuations that occur faster than that are of no interest. Low-pass filter 110 smooths out the signal for this reason as shown by curve 116 in FIG. 12.

Figure 13:
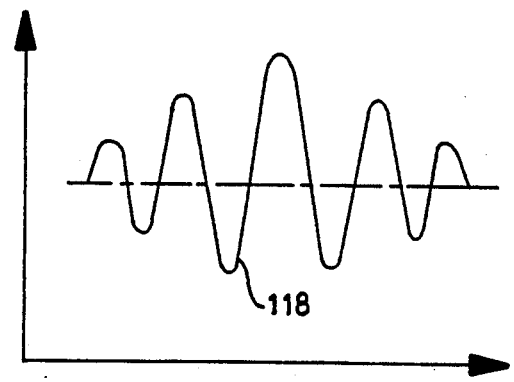
FIGS. 13–16 show the variation in signal output as the optical head scans through the peak signal generation points during a measurement cycle.
Figure 15:
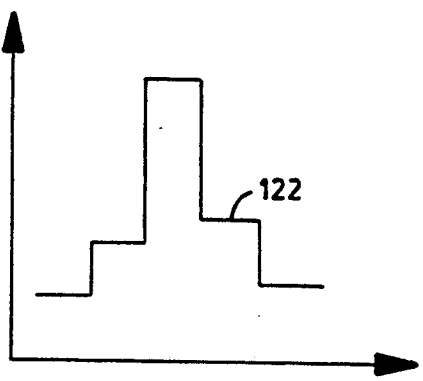
Figure 14:
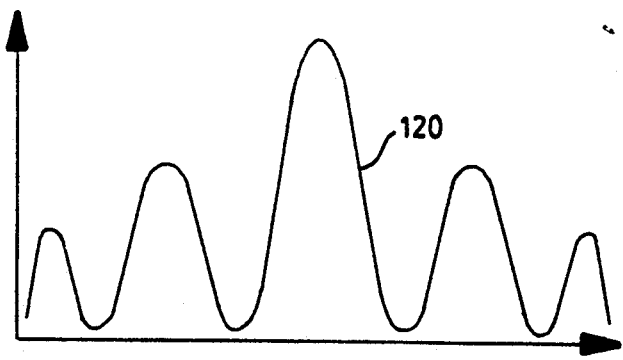

Having described the nature of the signal at or near the peak points, its variation with time, or as scanning optical head 50 moves up and down, will now be taken up. FIG. 13 shows with curve 118 how the raw signal out of photodetector 84 varies with time or distance. FIG. 14 shows at 120 the signal variation with distance at the output of high-pass filter 104, and FIG. 122 its variation at the output stage of peak detector 106, designated here as curve 122. This signal is smoothed to provide the final signal for sampling by the A/D converter. Its variation with time or distance is shown by curve 124 in FIG. 16.

Figure 16:
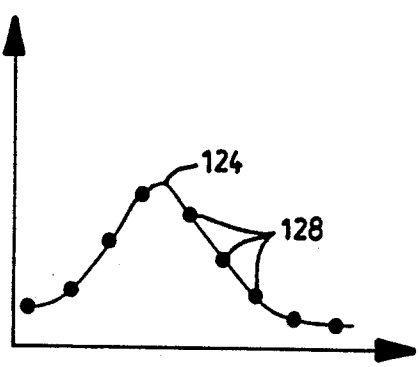

The smoothed voltage variation of curve 124, which is changing with scanning head 50 location, several samples are taken with the A/D converter and curve fitting is done to establish where that peak is by fitting a tilted parabola through the data points shown schematically at dots 128 in FIG. 16. Here, it will be remembered that distance is presented as time with the signal starting as a small ripple followed by a large modulation. For purposes of clarity, the modulated signal actually goes through many more peaks which would all be under the envelope. However, only a few are shown here for purposes of illustration.

The signal variations depend on how quickly they peak and on how fast the stepper motor 58 (FIG. 4) is driven. The horizontal axis is distance so if stepper motor 58, that translates entire scanning head 50, is moving slowly, then there will be many more cycles at a given modulation level. Consequently, peak detector 106 allows for a change in the speed at which stepper motor 58 is driven. What's really being detected is the envelope of those oscillations.

Curve 124, again the slowly varying output, is thus being used to provide the information from which the curvature can be determined by subsequent calculation. This changes as a function of distance as shown.

Signal processor 100 is physically located on a board in optical head 12. It's output is fed to the I/O board in computer 14 in response to signals from computer 14 to make A/D conversions. For every signal given, the output signal is sampled and held in a well-known manner in conjunction with the location of the scanning head 50 known by virtue of command signals given to stepper motor 58 after certain commands. In this manner, data points that such as those shown at 128 in FIG. 16 are generated and read into an array in computer 14 for subsequent analysis. Through these points, a tilted parabola is fit. Basically, the peak points are found and then a number of points on each side of it—say, three on each side, are taken, but not always the three adjacent points. Sometimes, the center point is taken and then every other point going away from it depending on the rates of change involved. This is an option built into the computer software. This way if there is a more shallow peak, one can obtain a better definition of the parabola.

The factors of importance in choosing grating 72 center around the quality of the finish of the surface under test. With system 10, the modulation transfer function (MTF) of the entire optical system is that of microscope objective 70 and the surface under test. Consequently, the MTF is really determined by the numerical aperture of microscope objective 70. With a 10× objective with an NA of 0.17 about f/3, the diffraction cutoff frequency is about 500 line pairs/mm. This can't be sampled because there will be zero modulation. So, what is required is a frequency that has fairly high modulation which, when passing through focus, is sensitive to the focal position. If the spatial frequency is too low, say one line pair/mm, there is an enormous depth of focus. Therefore, an intermediate point is needed. It has been found that for measuring radii, a spatial frequency around 15 line pairs works well. Thus, two extremes force the choice for something moderate. On the basis of the curve fitting that is being done, something that is slowly varying is indicated. On this basis, one could go to 300 lines pairs. That would be 3/5 ths, which gives roughly 40 percent modulation. However, this would probably be too sharp. So, there is a relationship, through focus MTF, which shows that a ten percent drop in modulation corresponds to a focus shift of 50 microns at that spatial frequency. This is about a twentieth of a mm and is small compared with actual experience. Fabricated devices actually measure consistently within a few microns which is about a factor of 10, better than the rough 50 micron analysis above predicts. This is however, after the curve fitting which is being done as scanning head 50 is being stepped through every five microns. Since, the curve fitting goes out to about 30 to 45 microns on each side of the peak, there probably is some benefit in accuracy from this approach.

Parabolic approximations are being used because it is generally recognized as a good approximation to the signal modulation from a lens going through focus, a function which goes as sin x/x. Sin x/x in an approximation around x, goes as roughly $1 - x^2/6$.

When system 10 is first calibrated, a nominal radius is entered so the position of scanning head 50 is roughly known because the working distance of microscope objective 70 is given and its upper possible position is also known. The upper position corresponds to the upper limit switch on scanning head 50 which stops it from crashing into the top test plate. This is found first, and the stage is then backed up to some position lower that the expected radius of curvature. The test surface location is then roughly known at this time. Optical head 50 is then backed down and the test surface located. Once this is done, what is done is to back down and take data through where the center of curvature should be plus the tolerance and a safety margin because so that critical data is not chopped off near the peak. All of the data is stored as the stage travels 5 microns at a step. The position of the peak signal is kept track of. Once this is established, one then goes to that position and the curve fitting is done. Calculations are always done from the stored data.

The foregoing discussion applies, of course, to the measurement of radii of curvature along one azimuth. To measure along different azimuths, especially for use in measuring toric surfaces, the test surface may be rotated by the rotary table assembly 38 under the influence of stepper motor 52 (See FIGS. 4 and 17). Assembly 38 is rotated in precise angular intervals under the control of computer 14. For this purpose, motor 52 is drivably connected to assembly 38 via a sprocket 140 at its output shaft. Sprocket 140 connects with another sprocket 146 fixed to lens mount 42 via a flexible belt 144. The angular interval through which a test surface can be rotated depends in the usual way on the ratio of the sprocket diameters and stepper motor angular resolution. However, it should be clear that the interval by simply setting the number of motor pulses correctly to achieve the desired angular movement. Thus with assembly 38 in conjunction with computer 14, measurements at each angular position can be made.

In the rotational mode of operation, the grating orientation remains unchanged—what is changing is the angular orientation of the part with respect to the grating arrangement. It will be appreciated that there is a preferred orientation of the grating which is tangential to the center of its rotation. At the same time the position of the grating in front of the detector its radially orthogonal to the incoming ray cone but inverted, rather than overlapping exactly when in phase.

As shown in FIG. 7c, system 10 can be used with a smaller and less expensive microscope objective 150, but in this case, in this case its smaller working distance reduces the range of radii of curvature that can be measured.

Control and operator interfacing with system 10 is provided via a software program coded in a well-known manner to behave in accordance with the following functionality. The coding may be in any suitable computer language such as Basic or "C".

The computer system will boot-up directly into a radius measurement program. Then the user will be prompted to enter a 1, 2, or 3. Option 3 allows the user to run DOS or other applications while Option 1 initiates the Program without the ability to calculate back vertex power (BVP) and Option 2 the ability to calculate it every time a radius of curvature is measured.

STARTING THE PROGRAM

To use the program, the computer is simply turned on. If the computer is already on, typing cntrl-alt-del will re-boot the system and commence program execution. There are an number of files required for the program to run. They include:

| | |
|---|---|
| COMPANY.EXE | Executable program |
| COMPANY.CON | Configuration file |
| MONOMER.DAT | Monomer data file |
| BEGINN.SCR | Program screen files |
| ENTDA.SCR | TEST.SCR |
| ENTDA0.SCR | BVP1.SCR |
| ENTDA2.SCR | BVP2.SCR |
| ENTDA20.SCR | TEST1.SCR |
| ENTDA3.SCR | ROT.SCR |
| TITLE.SCR | TITLE21.SCR |
| ZSCANP.SCR | TITLE2.SCR |
| SETINT1.SCR | |
| AUTOMD1.SCR | |
| FINDCNTR.SCR | |
| CALORAUT.SCR | |
| RADIUS.SCR | |
| BLUE.SCR | |
| BVP.SCR | |

The Program is initiated from DOS by typing PROGRAM NAME and the enter key. To activate the BVP calculation COMPANY MONOMER is typed and entered. The part to be measured is then placed curved side down so that it rests on the three balls (40) located on the top of the instrument. The part should rest squarely on balls (40) so that the center of the part is measured. If the part is tilted, an off-axis portion of the part will be measured. This problem can be eliminated by precisely centering the part under test with a centering fixture.

USING THE PROGRAM

After starting the Program, a company logo and license screen appears and be displayed for a few seconds. Then the main data entry menu is displayed on the monitor. The user is then prompted for the name of the operator, the radius of the mold the tolerance of the mold (the default is 0.100) and the mold id. These can be entered using the keyboard, arrow, and enter keys. The tolerance is the full width of the acceptable range centered about the nominal radius. After the last entry is made the main menu is displayed. The main menu lists the active function keys.

FUNCTION KEYS

The commands for the different features in the Program are given via the function keys which are preset as follows and also displayed on the main menu screen:

F1>ROTARY SETUP; This feature allows the user to select the number of azimuths measured across the part and the angular increment between positions.

After typing the "F1" key, a new screen is displayed on the terminal. This screen first exhibits the current number of positions and prompts the user for input. After entering the number of positions, the user can then enter the angular increment between positions (in degrees).

F2>INTENSITY; This feature allows the user to measure the relative intensity read by the detector at the current position.

After typing the "F2" key, a new screen is displayed on the terminal. This screen exhibits "INTENSITY", and then prints in white the intensity being read.

F3>NEW MOLD; This feature allows the user to enter data for a new mold into the program.

After typing the "F3" key, a new screen is displayed on the terminal. The user is then prompted for the name of the operator, the radius of the mold, the tolerance of the mold (the default is 0.100) and the mold id. If the program was initiated using option 1 or the COMPANY MONOMER command, a second screen follows which prompt the user for the measured mold radius, the lens center thickness, and monomer type. This information will be used in all subsequent radius calculations so that both BVP and Label Power will be calculated and displayed.

(NOTE: After using this function, the program recognizes that a new mold has been entered and will not allow the usage of MEASURE RADIUS (F5) until the new surface image has been found via CALIBRATE (F4) or AUTOMATIC MODE (F6). MEASURE RADIUS requires that the surface image be found before it can measure a radius.)

F4>CALIBRATE; This feature allows the user to manually calibrate a new surface point, find a radius, and print a graph of intensity versus microns. After typing the "F4" key, a new screen which reads "CALIBRATING" is displayed on the terminal. For the next several seconds, the motor will move as it locates the surface and measures the radius. If graphing has been enabled using the "G" command, a graph of intensity versus distance in microns will appear when the calibration is complete. This graph covers all intensity readings from a point which is 0.6 times the tolerance before the center to a point ending 0.6 times the tolerance after the surface. Thus the graph gives a full reading across the length of the mold. After a few seconds the graph will disappear and the calculated radius will be displayed until the user hits the "return" key.

After a Calibration has been performed, the program now has in its memory a new surface peak location. MEASURE RADIUS (F5) may now be used to manually find new center points for different molds and measure their radii.

F5>MEASURE RADIUS; This feature allows the user to manually measure the radii of different molds and print a graph of the area about the center point. If multiple azimuths are measured, the average, maximum and minimum radius will be displayed.

If data for a new mold has just been entered via NEW MOLD (F3) or by the initial activation of the program, then the measure radius routine will not allow a new measurement until a new surface image has been found via CALIBRATE (F4) or AUTOMATIC MODE (F6). If "G" is typed before the F5 key or the red button is depressed a graphical display of the center peak will be toggled off or on. This graph starts at a point which is 0.6 times the tolerance before the center and ends the same distance after it. After a few seconds the graph will disappear and the calculated radius will be displayed until the user hits the "return" key, F5, or the red button on the optical head. The graph may be retained on the screen by striking any key while it is displayed. Operation will continue when a key is struck again. This graph will be displayed after every subsequent radius is measured. To retain the graph on the screen strike any key while the graph is displayed. Operation will continue when another key is struck. To stop the graphing process, type "G" again.

The red button (40 in FIG. 5) functions identically to the F5 key and allows the user to test a batch of parts without striking the keyboard. If the MONOMER option has been activated then both BVP and Label power will be calculated and displayed.

F6>AUTOMATIC MODE; This feature finds the surface peak, allows the user to measure the radii of an infinite number of molds with the options of printing the graphs of the center peaks and of writing the measured radii and other data to a file. The red button (40) on the top of the optical head signals computer 14 that a part is in place ready for measurement.

CALIBRATING SURFACE; After typing the "F6" key, a new screen with a variety of data about the mold or molds being tested is displayed. In the lower left corner is a box labeled "STATUS". Within this box one of the four status modes will be display. For the next several seconds the motor moves as it locates the surface point. While it is doing this, a star is printed in the status box next to "CALIBRATION/SETUP". When the motor stops moving, a star will be printed in the status box next to "READY FOR LOAD/UNLOAD", and AUTOMATIC MODE is now ready to measure radii.

MEASURING RADII; The status box will star "READY FOR LOAD/UNLOAD" when it is ready to measure. With a mold loaded on the bench, the button 41 is pressed. The status box stars "MEASUREMENT UNDERWAY". Within three seconds the radius will be measured and the status box will star "MEASUREMENT COMPLETE" and "READY FOR LOAD/UNLOAD". The radius of the lens is displayed in the lower right corner along with a variety of other data on the center of the screen. If the Monomer option has been activated then the BVP is displayed to the left of the radius. The Program is now ready for further measurements. As well as the radius, the program displays after each measurement: the nominal radius, tolerance, number of parts measured and accepted, number of parts long and short, the mean radius of those parts accepted and their standard deviation. Also, next to where the radius is displayed an "L", "S" or "G" is indicated, depending on whether the radius was long, short or within tolerance. If it were within the upper third of the tolerance a "+" is printed next to the "G", if in the lower third, a "−". To exit AUTOMATIC MODE return is pressed. NOTE: Upon exiting AUTOMATIC MODE all data is LOST unless it was otherwise saved in a file.

WRITING TO A FILE; When the user first enters the actual radius measurement portion of AUTOMATIC MODE, the Program prompts at the top of the screen "Do You Wish To Write To A File?". If the user replies "Y", the program requests the name of the file. The file name can include drive and path selection. The program next asks whether to write the individual radii calibrated to a file, if the reply is "Y", then the radii and other data (mean radius, standard deviation, $\pi$ accepted, etc.) is stored in the file, otherwise just the other data is stored. A sample data file is listed below.
"16:40:37"
"SDF", "RMI TEST 1"
"MEASUREMENT:"
8.117903,"G"," "
8.120394,"G"," "
8.117807,"G"," "
8.119114,"G"," "
8.1209,"G"," "
8.119972,"G"," "
8.120342,"G"," "
8.117917,"G"," "
8.119495,"G"," "
8.120897,"G"," "
8.118283,"G"," "
8.11461,"G"," "
8.1202,"G"," "
8.117856,"G"," "
8.119111,"G"," "
8.118348,"G"," "
8.118804,"G"," "
8.120077,"G"," "
8.116938,"G"," "
8.116644,"G"," "
"Nominal Radius=",8.1
"Tolerance=",0.2
"High=",0
"Low=",0
"Good=",20
"Number Tested=",20
"Mean of Radii=",8.118780660629273
"Standard deviation=",1.564812E-03

The first line contains the date and time. The second line lists the operator and the part identification. The third line indicates that the individual radius measurements follow. The individual measurements are listed as the radius, a letter code (g for good, L for long radius, S for short radius, T for low signal level, or B for bad reading) followed by a "+","−", or " " qualifier if the part measures "G". The "B" code signifies that the radius measurement was not successful. This may be due to an unusually long or short radius, or a missing part during the read. The "T" code usually indicates a low signal due to a deformed part, dirty surface, or defective lamp. At the end of the list, the nominal radius and tolerance are listed as well as a statistical summary of the parts measured. The mean radius and standard deviation include only passing parts (i.e. parts measuring G+,G, or G−). If the operator chose not to include individual radii in the file, the statistical summary is still included. If multiple azimuths are measured, then the average radius as well as the individual measurements are stored.

If the Monomer option has been activated, then the BVP for each measurement is stored as well as the average BVP and the characteristics of the monomer (refractive index, and hydration expansion factor).

If any errors are encountered while trying to work with the file, an error message is printed at the top of the screen, the file is no longer written to and the program pauses in execution until the user hits the return key. If any such errors do occur, however, the program stays in the automatic mode, prompts the operator, and is ready to continue measuring radii.

GRAPHING THE CENTER PEAK; Hit the "G" key at any time during the radius measurement portion of AUTOMATIC MODE to see a graph signal. After the radius is measured, the screen is clear and a graph starting at a point .6 times the tolerance before the center peak, to a point .6 times the tolerance after the peak is printed. This graph is displayed after every subsequent radius is measured. To retain the graph on the screen strike any key while the graph is displayed. Operation continues when another key is struck. To stop the graphing process, type "G" again.

F7>RESTART PROGRAM; After typing the "F7" key, the program will re-start from the beginning.

F8>BVP CALCULATOR; After typing the "F8" key, the program displays a screen requesting the lens/mold radius, the measured mold radius, the lens center thickness, and the monomer type. The program then calculates and displays the Back Vertex Power and Label Power. The user must hit the esc key to exit this menu. BVP is defined as:

$$BVP = 1000 * [\{Rm/(N-1) - t/N\} - 1 + (1-N)/Rb]/E$$

where N is the refractive index,
E is the hydration expansion factor,
t is the center thickness (dry = wet thickness/E),
Rb is the Back curve radius (dry = BCOR),
and
Rm is the measured lens/mold radius.
All linear units in mm.

F9 > BCOR CALCULATOR; After typing the "F9" key, the program displays a screen requesting the aim back vertex power, the measured lens/mold radius, the lens center thickness, and the monomer type. The Program then calculates and displays the BCOR. The user must hit the esc key to exit this menu. BCOR is defined as:

$$BCOR = 1000 * (1-N)/[(BVP*E - 1000*\{Rm/(N-1) - t/N\} - 1]$$

where N is the refractive index,
E is the hydration expansion factor,
t is the center thickness (dry = wet thickness/E),
BVP is the aim back vertex power, and
Rm is the measured lens/mold radius.
All linear units in mm.

F10>END; After typing the "F10" key, program execution ends.

Esc>ESCAPE; When in any of the function modes, pressing the Esc (escape) key causes the program to exit the current routine and return to the main menu.

EDITING THE MONOMER.DAT FILE

The MONOMER.DAT file contains the name, refractive index, and hydration expansion factor data which is used to calculate back vertex and label power. The name for the monomers is 1 upper-case letter (A-Z), and the data must is entered according to the following format.

"A", "1.508", "1.186"
"B", "1.208", "1.1186"
END

Up to 26 monomer types may be included. The MONOMER.DAT file is in ASCII format and can be easily edited using the EDIT.EXE editor. Typing "EDIT MONOMER.DAT" initiates editing of the monomer data file. The user is then able to edit the file in full screen format. Typing "F1" key saves the modified file. Complete instructions are available by typing "F10".

CHANGING KEY VARIABLES VIA THE CONFIGURATION FILE

It is possible to externally change certain key variables in the main program via direct editing of the configuration file, COMPANY.CON. This is an ascii format file which may be edited from DOS using the editor, EDIT.EXE. These variables in the file are of the form "variable name", value with the name of the variable in quotation marks, followed by its value. If the values to these variables are changed, this form must be maintained. The variables in the file are:

"NTIMES",1—NTIMES controls the number of times the photo detector is read and averaged each time a call is made to read the intensity. If NTIMES is increased, the accuracy is increased very slightly, but the speed of the program is greatly decreased.

"SSSTEP" 3—SSSTEP determines the distance in motor steps separating the points used to determine the least square3 s best fit for the approximation of the graph of the surface peak. A value of two or three has proven to produce the most accurate approximation.

"CSSTEP",3—CSSTEP determines the distance in motor steps separating the points used to determine the least square's best fit for the approximation of the graph of the center peak. A value of two or three has proven to produce the most accurate approximation.

"THRSSHLD",800—THRSSHLD determines the minimum allowable peak intensity for a center or surface peak.

"CALAGAIN",50—In AUTOMATIC MODE, CALAGAIN determines the number of times measurements of radii can be made before the AUTOMATIC MODE re-calibrates a new surface point to insure that the motor has not slipped any steps in its measuring.

"GRMAX", 1024—GRMAX determines the maximum intensity value of the graphs.

"PTHRESH",800—PTHRESH determines the threshold for peak detection at the surface.

"TOLER",.1—TOLER is the default radius tolerance (mm.).

"NRADIUS", 8.0—NRADIUS is the nominal radius (mm.).

"ANGLE", 45—This specifies the angular increment between azimuths.

"ROTATE", 1—This specifies the number of azimuths to be measured.

"SCFACTOR", 1.25—This specifies the level below which low threshold parts are deemed bad. Thus, any part whose measured radius is below the value of (THRSSHLD/SCCFACTOR) will be considered a bad part and no radius will be returned in the manual measurement mode.

The default values listed are suggestions. If the reflectance of the part under test changes substantially, the operator will want to alter the threshold values THRSSHLD and PTHRESH. If the graphs substantially overfill or underfill the axes, the value of GRMAX should be adjusted. If any changes are made in the configuration file, it is essential that at the file's end "END",O is written or else an error message will be incurred.

The editor may be invoked by entering "EDIT COMPANY.CON" from DOS. This will initiate the editor. The user will then be able to edit the file in full screen format. Typing "F1" key will save the modified file. Complete instructions are available by typing "F10".

In the automatic and manual modes, a special algorithm is used to increase the speed of operation of system 10. It is based on the mathematical equations relating sag height to the reference plane defined by balls 40. System 10 to save time and full travel for each measurement measures, instead of the radius of curvature for each test surface, measures the difference in curvature between the first part measured during calibration mode and every subsequent part. Then it computes the difference in sag height for each part. Once a calibration is done to physically measure the vertex and curvature of the calibration part, the systems positions scanning head 50 at or below C1, the calibration part curvature position. For every subsequent measurement on the same approximated radius part, the difference in curvature which is equal to, say, C2−C1 is computed. The difference is sag is then computed from: delta sag=$R-(R^2-y)^{\frac{1}{2}}$. $Y^2$ is the distance between balls 40. R is the radius of curvature. The new radius then equals $\Delta C - \Delta S$.

Figure 18:
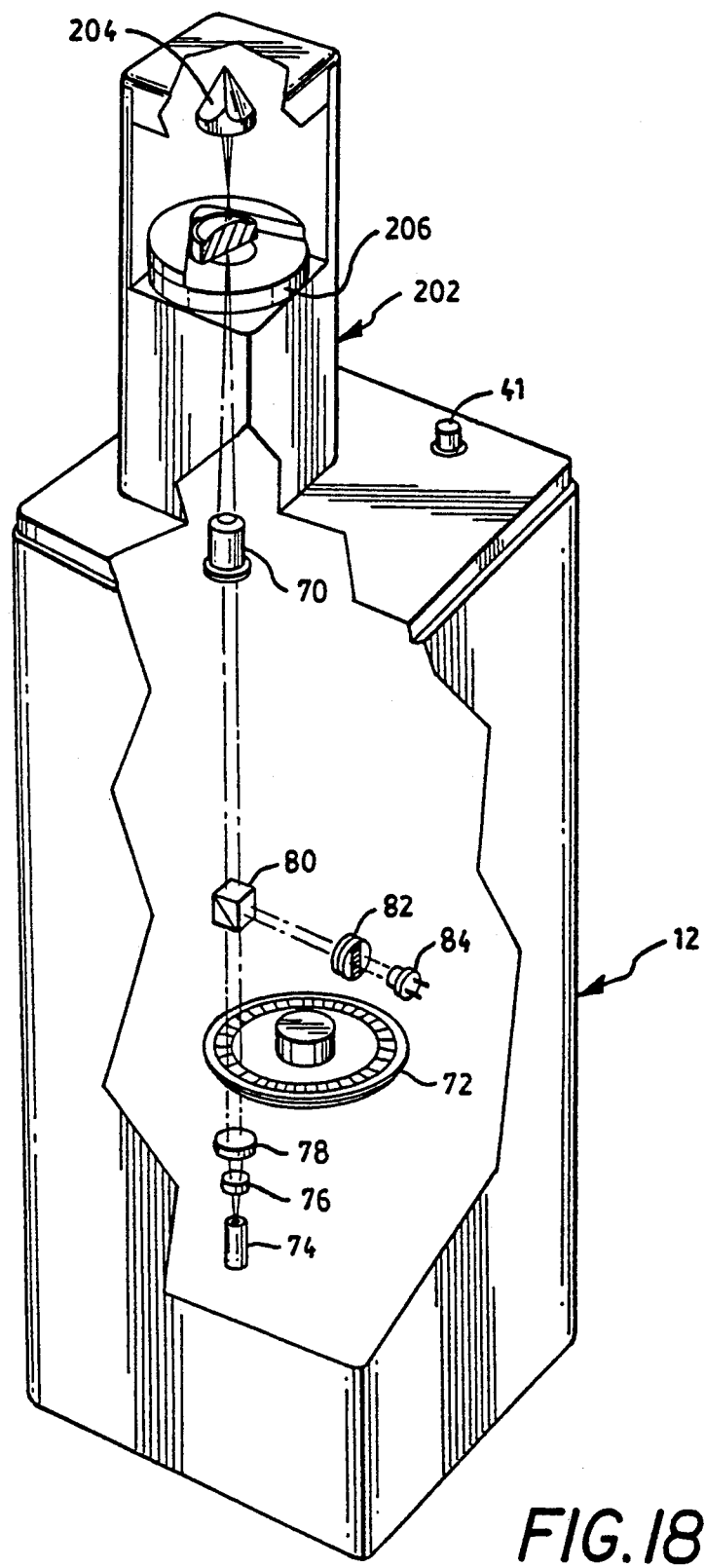
FIG. 18 is a diagrammatic perspective of the optical head of another embodiment of the inventive system for measuring flange focal length.
Figure 19:
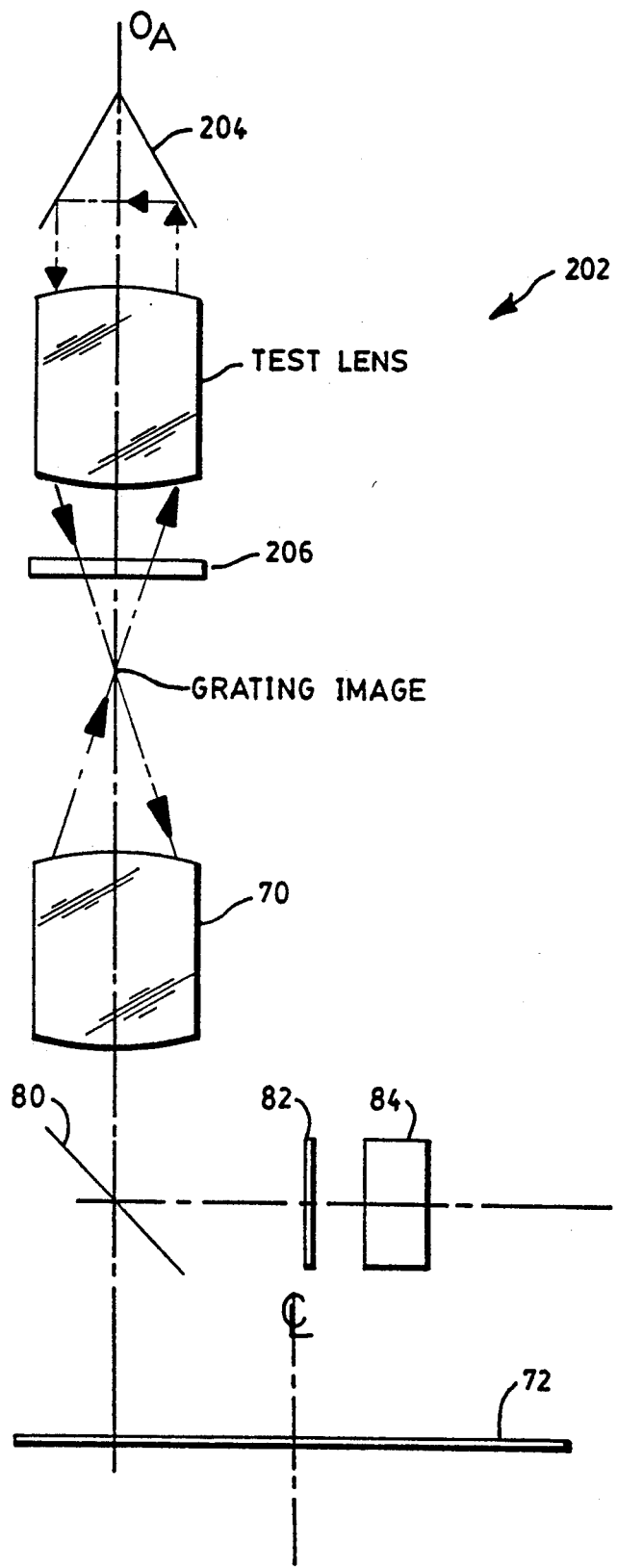
FIG. 19 is a diagrammatic elevation of the embodiment of FIG. 18 illustrating its measurement methodology.

Another embodiment of the invention is shown in FIGS. 18 and 19 where it is designated generally at 200. This version is for the measurement of back focal length or vertex focal length. System 200 measures back focal length in one azimuth and its use is limited to lenses of positive or net positive power. To do this the reference plane is replaced with an autocollimation system 202 that has a reference flat 206 and a retro lens 204.

Thus, reference flat 206 comprises a means for defining a reflective surface along a longitudinally extending reference axis. As can readily be seen, retro lens 204 is positioned a fixed distance along the reference axis with its own optical axis aligned therewith. here, a test lens is supported and positioned above reference flat 206 at a test station between it and retro lens 204 so that its optical axis is in alignment with reference flat 206 and its mounting flange position with respect to reference flat 206 is readily determinable. As before, a real image is formed and moved along the reference axis, toward and away from the surface to be measured, while an electrical signal is generated as a function of the position of the real image along the reference axis. The electrical signal peaks, as before, as the real image passes through the focal point of the test lens and the vertex of reference flat 206. The signal is monitored as before and the distance between the positions at which the signal peaks is correlated with the flange focal length of the test lens by simple arithmetic operations well-known to the art.

Structured in this way, system 200 represents an autocollimation scheme with the software program modified in a well-known manner to look for focus instead of radius. So the peak here, especially a multielement lens is at its focus.

Other variations of the invention will be obvious to those skilled in the art. For example, it would be a simple task to modify the system to permit calculation of power of lenses by permitting it to generate four peaks corresponding to the two vertex locations and two center of curvature locations. Knowing the material index, one could then calculate the lens power through the use of the lens makers equations.

Those skilled in the art may make other changes without departing from the scope of its teachings. Therefore, it is intended that the embodiments shown herein be considered illustrative and not in a limiting sense.

What is claimed is:

1. Apparatus for automatically measuring the radius of curvature of convex or concave surfaces, said apparatus comprising:

means for supporting and positioning a surface to be measured in a predetermined position with its center of curvature lying substantially along a longitudinally extending axis;

means for forming an extended real image having periodic structure in an image plane and automatically moving said extended real image along said longitudinal axis in response to at least one command, toward and away from the surface, such that said surface forms a reflected image of said extended real image, the quality of focus and said periodic structure thereof varying as a function of the position of said extended real image with respect to said surface;

means for automatically evaluating said quality of focus and periodic structure of said reflected image in said image plane and generating an electrical signal whose amplitude varies in accordance with variations in said quality of focus and periodic structure of said reflected image as said extended real image is automatically moved along said longitudinal axis, said electrical signal peaking as said extended real image passes through a first position along said longitudinal axis corresponding to the center of curvature of the surface and a second position along said longitudinal axis corresponding to the vertex of the surface; and means for automatically monitoring said electrical signal and determining the distance between said first and second positions where said electrical signal peaks, which distance equals the radius of curvature of the surface.

2. The apparatus of claim 1 wherein said means for supporting and positioning a surface to be measured comprises three balls.

3. The apparatus of claim 1 wherein said means for forming an extended real image in an image plane and automatically moving said extended real image along said longitudinal axis comprises:

(a) an optical head that is mounted for movement as a unit along said longitudinal axis; and
   (b) means for selectively driving said optical head along said longitudinal axis toward and away from the surface to be measured so that, as said extended real image passes through the surface's center of curvature and vertex, it is reflected off the surface and back along said longitudinal axis with optimal contrast.

4. The apparatus of claim 3 wherein said optical head comprises:

(a) a target;
   (b) a source for illuminating said target;
   (c) an objective lens for imaging said target in said image plane which is at a predetermined location from said optical head as measured along said longitudinal axis;
   (d) detector means;
   (e) means for combining the optical path between said target and said detector means so that both can view along said longitudinal axis toward the surface to be measured as said optical head moves toward and away from the surface to be measured.

5. The apparatus of claim 4 wherein said target comprises a grating oriented along a single azimuth.

6. The apparatus of claim 5 wherein said grating has a spatial frequency in the range between 1 and 400 line pairs per centimeter.

7. The apparatus of claim 5 wherein said source comprises an LED.

8. The apparatus of claim 5 wherein said detector means comprises a single photodiode and a grating associated with said photodiode and positioned upstream of said photodiode.

9. The apparatus of claim 8 wherein said target grating rotates and said grating associated with said photodiode is fixed.

10. The apparatus of claim 5 wherein said means for combining the optical paths between said target and said detector means comprises a beamsplitter located between said detector means and said location at which said real image is formed.

11. The apparatus of claim 3 wherein said extended real real image is formed by periodically interrupting a light source with a rotating grating to provide a changing pattern of illumination.

12. The apparatus of claim 3 wherein said means for selectively driving said optical head along said longitudinal axis comprises a precision lead screw coupled with said optical head and a stepper motor for rotating said lead screw in precise angular increments.

13. The apparatus of claim 1 wherein said means for supporting and locating a surface to be measured further includes means for rotating the surface so that its radius of curvature can be measured along different angular azimuths.

14. The apparatus of claim 1 wherein said means for monitoring and determining the radius of curvature comprises a general purpose computer and an input/output board configured to sample said signal as a function of the position of said image, fit a curve to it to establish said peaks, and calculate the distance between said peaks.

15. The apparatus of claim 1 further including a housing and wherein said means for supporting and positioning a surface to be measured is arranged with respect to said housing so that a surface to be measured lies external to said housing and wherein said means for forming and moving an extended real image along said longitudinal axis is arranged with respect to said housing so that said extended real image moves towards and away from the surface substantially inside of said housing.

16. The apparatus of claim 1 wherein said periodic structure of said extended real image has a predetermined spatial frequency and the measure of said quality of focus and periodic structure of said reflected image is its contrast at said predetermined spatial frequency.

17. Apparatus for measuring the flange focal length of a positive lens, said apparatus comprising:

means for defining a reflective reference surface along a longitudinally extending reference axis;

a retroreflector positioned a fixed distance along said reference axis with its optical axis aligned therewith;

means for supporting and positioning a test lens above said reference surface at a test station between it and said retroreflector so that its optical axis is in alignment with said reference axis and its mounting flange position with respect to said reference surface is determinable;

means for forming an extended real image in an image plane and automatically moving said extended real image along said longitudinal axis, toward and away from the positive lens, such that a reflected image of said extended real image is formed along said longitudinal axis, the quality of focus of which varies as a function of the position of said extended real image with respect to the positive lens;

means for evaluating said quality of focus of said reflected image in said image plane and generating an electrical signal whose amplitude varies in accordance with variations in said quality of said reflected image and peaks as said extended real image passes through a first position along said longitudinal axis corresponding to the vertex of said reference surface and a second position along said longitudinal axis corresponding to the focal point of the positive lens; and means for monitoring said electrical signal and determining the distance between said first and second positions where said electrical signal peaks, which distance correlates with the flange focal length of the positive lens.

18. The apparatus of claim 17 wherein said extended real real image is formed by periodically interrupting a light source with a rotating grating to provide a changing pattern of illumination.

19. The apparatus of claim 17 wherein said reference surface is a flat.

20. A method for automatically measuring the radius of curvature of convex or concave surfaces, said method comprising the steps of:

supporting and positioning a surface to be measured in a predetermined position with its center of curvature lying substantially along a longitudinally extending axis;

forming an extended real image having periodic structure in an image plane and automatically moving said extended real image along said longitudinal axis in response to at least one command, toward and away from the surface, such that said surface forms a reflected image of said extended real image the quality of focus and periodic structure thereof varying as a function of the position of said extended image with respect to said surface;

automatically evaluating said quality of focus and periodic structure of said reflected image in said image plane and generating an electrical signal whose amplitude varies in accordance with variations in said quality of focus and periodic structure of said reflected image as said extended real image is automatically moved along said longitudinal axis and peaks as said extended real image passes through a first position along said longitudinal axis corresponding to the center of curvature of the surface and a second position along said longitudinal axis corresponding to the vertex of the surface; and automatically monitoring said electrical signal and determining the distance between said first and second positions where said electrical signal peaks, which distance equals the radius of curvature of the surface.

21. The method of claim 20 further comprising the step of measuring the radii of curvatures of additional surfaces by measuring the difference in the position of their centers of curvature from the position of the center of curvature of a first measured surface, determining the differences in their sagitta compared with that of the first measured surface, and calculating their radii of curvatures on the basis of the relationship between the radius of curvature and saggital height of a spherical surface.

* * * * *